Figure 1:
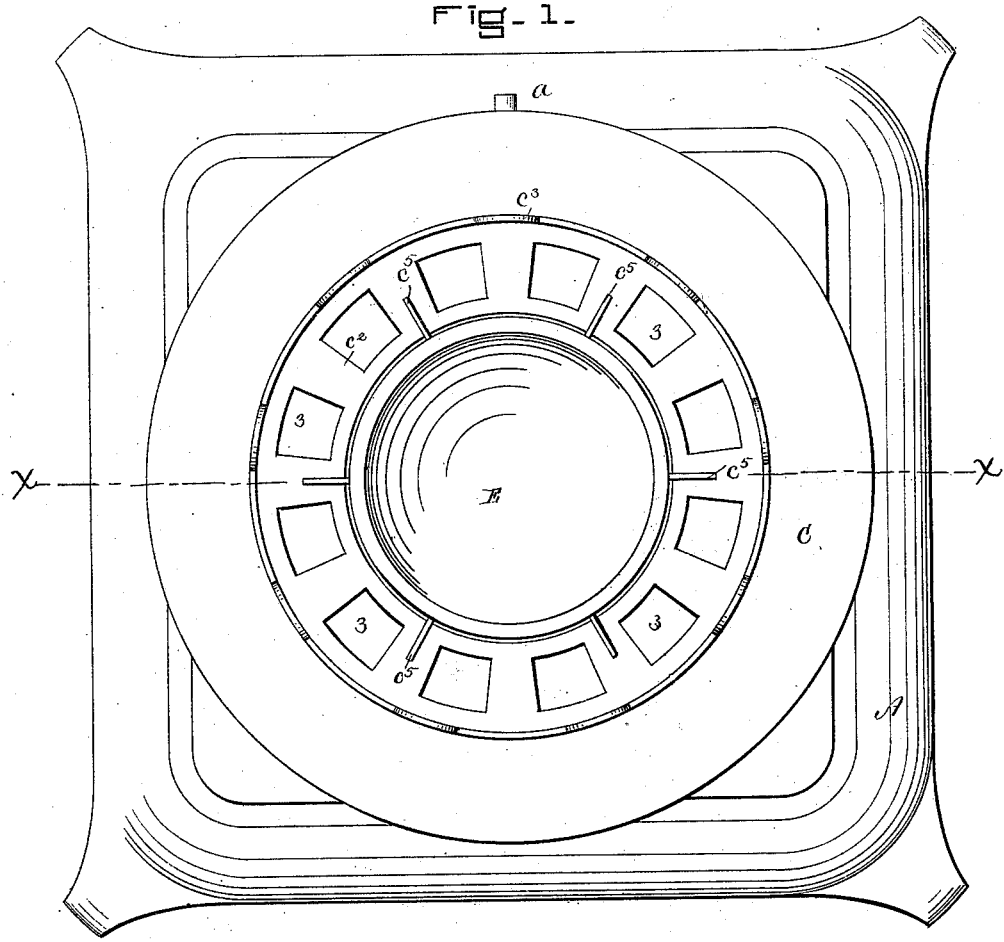

(No Model.) 2 Sheets—Sheet 1.

W. F. SHAW & A. S. DINSMORE.
GAS STOVE.

No. 285,311. Patented Sept. 18, 1883.

WITNESSES
A. O. Orne.
Fred A. Powell

INVENTORS
William F. Shaw
and
Alfred S. Dinsmore
by Crosby & Gregory
Attys.

(No Model.) 2 Sheets—Sheet 2.

W. F. SHAW & A. S. DINSMORE.
GAS STOVE.

No. 285,311. Patented Sept. 18, 1883.

WITNESSES
A. O. Orne
Fred A. Powell

INVENTORS
William F. Shaw and Alfred S. Dinsmore
by Crosby & Gregory
Attys.

UNITED STATES PATENT OFFICE.

WILLIAM F. SHAW AND ALFRED S. DINSMORE, OF BOSTON, MASS.

GAS-STOVE.

SPECIFICATION forming part of Letters Patent No. 285,311, dated September 18, 1883.

Application filed May 12, 1883. (No model.)

*To all whom it may concern:*

Be it known that we, WILLIAM F. SHAW and ALFRED S. DINSMORE, both of Boston, county of Suffolk, State of Massachusetts, have invented an Improvement in Gas-Stoves, of which the following description, in connection with the accompanying drawings, is a specification, like letters on the drawings representing like parts.

Our invention, relating to gas-stoves, has for its object to produce a more powerful and conveniently-operated stove than those heretofore in use, and in which gas may be burned without the production of deleterious and disagreeable odors, the construction of parts as hereinafter claimed enabling the products of combustion to be supplied with warm or heated air.

In gas-stoves consuming a mixture of air and ordinary illuminating-gas, the flame has in some cases been confined to a comparatively small space, in which case the heat is very intense, but is not sufficiently distributed for ordinary cooking or heating purposes; and in other cases it has been attempted to distribute the mixture to be consumed over a large space by causing it to pass through a large number of orifices at considerable distances from one another, and in such an arrangement the flame has much less power, and the combustion is almost invariably imperfect, giving rise to disagreeable and unwholesome odors; and, also, in connection with ovens heated by gas, a cone has been placed above the flame, to deflect and distribute the heat, to prevent burning the oven, and secure a more equal distribution thereof.

Our invention consists, essentially, in a burner adapted to deliver the gas-mixture to be burned into an enlarged perforated heating and mixing chamber or chimney, in which the same is delivered ignited as a concentrated mass of flame, combined with a flame spreading and distributing device extended down into the flame below the top of the enlarged perforated chamber, the latter, through its perforations, supplying the gas-mixture with atmospheric air, which is heated and minutely commingled with the flame, thus supplying it with heated oxygen to make greater heat and effect complete combustion, the spreading device distributing the flame over a large area for heating purposes, substantially as and for the purposes to be described. When thus constructed, the heat is sufficient to operate with several different cooking-utensils; and the invention further consists in the combination, with the burner, the perforated enlarged heating and mixing chimney or chamber, and flame-spreading device, and the stove-base containing them, of a detachable top or chamber provided with a series of openings or stove-holes to receive different cooking-utensils—such, for instance, as kettles or pans—or radiators for heating purposes, or other furniture commonly used with cooking-stoves, and especially with the small portable stoves that have been used for liquid fuel.

The invention also consists in various details of construction of the different parts constituting the stove, to be hereinafter more fully specified.

Figure 2:
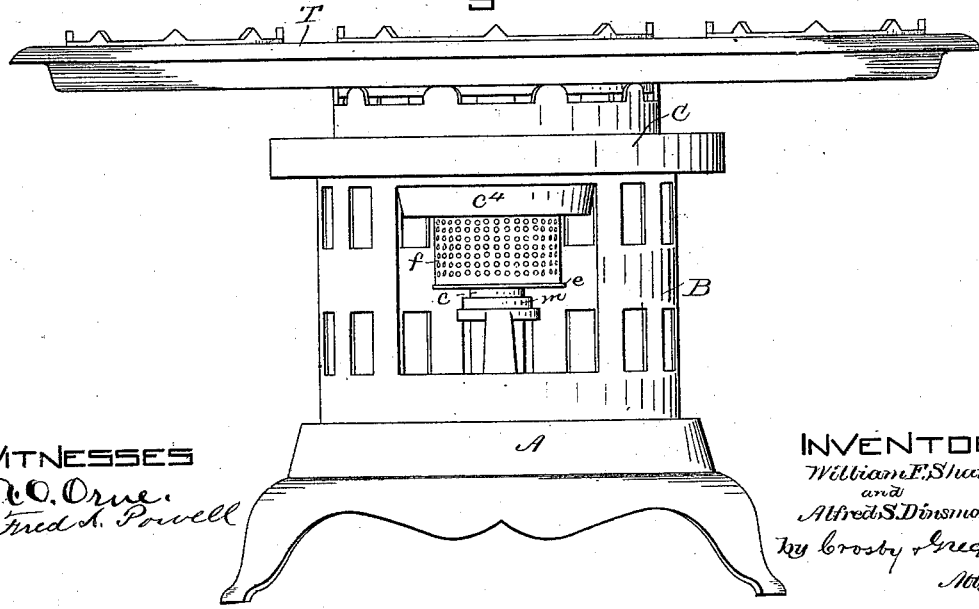
Figure 3:
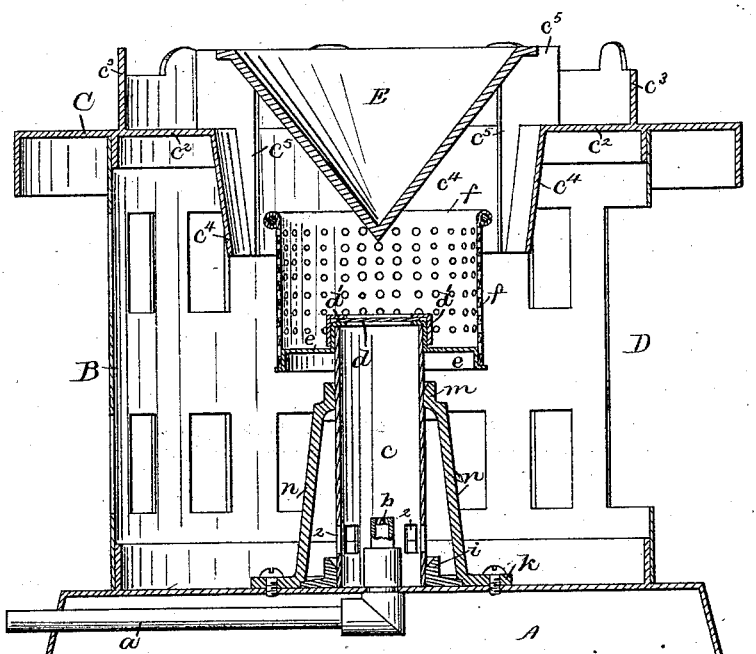
Figure 4:
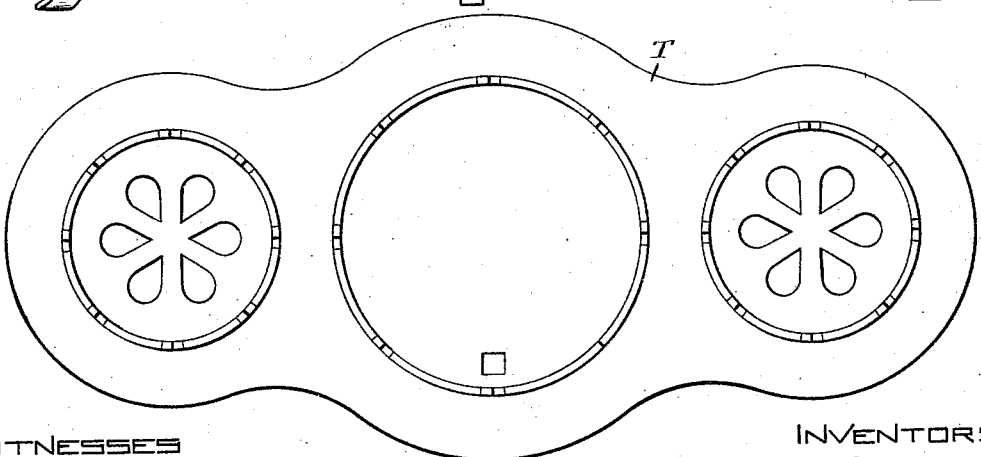

Figure 1 is a plan view of a gas-stove embodying this invention; Fig. 2, a front elevation thereof on a smaller scale, with a detachable top having a series of openings for different utensils; Fig. 3, a vertical section on line *x x*, Fig. 1, and Fig. 4 a plan view of the detachable top.

The base A (shown as of cast-iron) supports a casing or drum, B, which may be of sheet metal and perforated with ornamental openings, which also serve to admit air, the said casing being surmounted by a top, C, constructed as hereinafter described, the said parts A B C constituting the stove-body and inclosing the burner. The case or drum B has an opening, D, for giving access to the burner, and it may, if desired, be provided with a door; or the top C might be supported on and connected with the base A by posts or pillars, although the sheet-metal drum gives a better appearance.

The gas constituting the fuel is admitted through a pipe, *a*, (see Fig. 3,) adapted to receive the usual flexible connecting-pipe, and terminating in a jet-piece or tip, *b*, at the middle of the base A, the said jet-piece being of any suitable construction, that of the well-known fish-tail burner being well adapted for this use, the said tip being detachable to enable a tip of any desired capacity to be used, according to the pressure of the gas and the heat desired.

The burner proper employed in this instance of our invention consists of a tube, $c$, surrounding the jet-piece $b$, and provided with openings 2 around the said jet-piece, through which openings air enters, and, together with the gas issuing from the said jet-piece, passes up through the tube, which is provided at its top with a foraminous covering or cap, $d$, through the meshes of which the mixed air and gas issues, and upon being ignited burns above the said cap in a practically solid flame, giving out very intense heat. The upper end of the tube $c$ is provided with a wide flange, $e$, shouldered around its periphery to receive a perforated chimney, $f$, which constitutes an air heating and mixing chamber, the said chimney being composed of perforated sheet metal, which serves to admit numerous direct fine lateral jets of air into the flame from near the top of the burner upward, supplying the gas-flame with air containing oxygen heated by its passage into the said chimney or chamber, thus insuring substantially perfect combustion of all the gas. The cap $d$ is held in place by an annular collar, $d'$. The screen or chimney $f$, of considerable length above the top of the burner $c$, is securely fastened upon the flange $e$, and is imperforated for a short distance from its upper edge, which is rolled over a wire, as shown, in order to give it the requisite rigidity to enable it to be handled without danger of crushing it out of shape.

The top C of the stove is composed, mainly, of a flat or substantially horizontal portion, $c^2$, extending across the upper edge of the case or drum B, and provided with an upwardly-extending annular projection, $c^3$, to receive cooking-utensils or other articles to be heated, or, as shown in Fig. 2, to receive a detachable top, T, provided with two or more stove-holes. The said top T may be of any usual construction—such, for instance, as shown in Letters Patent No. 246,320, August 6, 1881—and does not need further detailed description or illustration.

At the inner edge of the flat or horizontal portion $c^2$ of the top C is a downwardly-extending hood, $c^4$, encircling the upper edge of the chimney $f$, and serving as a guide for the flame and heated gases arising from the burner.

The flame, if left to itself, would naturally rise in a slender column, and would give very intense heat at the center of the stove; but its effect would not be very wide-spread, and would not be efficient in cases when a considerable surface was to be acted upon, or where several cooking-utensils were to be heated at the same time. In order to overcome this objection, and to increase the range of action of the flame, a flame-spreading device, E, is employed, composed of a cone having its apex turned downward and made to enter, preferably as nearly central as possible, the column of flame below the top of the burner, where the flame has very considerable velocity, and where it has a direct movement by reason of its own force and the fact that it is confined in the chamber of the chimney, and the yet confined flame-current so penetrated and divided by the deflector is thereby spread widely and beyond the wall of the chimney, and as it is spread has its surface supplied with oxygen of the air. The flame-spreading device becomes intensely heated, and consequently radiates a large amount of heat in the space inclosed by the said extended or distributed flame.

The flame-spreading device E is supported in proper position upon a series of fingers, $c^5$, forming a part of the top C, and projecting upward from the portions $c^2$ $c^4$ thereof. The flat portion $c^2$, between the hood $c^4$ and the drum B, is provided with a series of openings or passages, 3, for air to pass upward from the interior of the drum, it becoming heated by the flame, and serving to convey the heat to the points where it is to be used. It is essential for the most efficient operation that the spreading device E should be concentric with the column of flame, or with the burner-tube $c$, and this is insured by the burner-holder consisting of a shallow socket-piece, $i$, to receive the lower end of the said tube, the said socket $i$ being held in place by the annular base $k$ of the tube-supporting ring $m$, connected with the said base by arms $n$. The said base $k$ is rigidly fixed upon the base A, as by screws or rivets, and the piece $i$ and ring $m$ constitute a burner-holder, by which the burner is securely held both at its upper and lower ends, while the air has ready access to the openings 2 of the said burner. The spreading device E is preferably loosely held upon the fingers $c^5$, so that it may be readily removed when desired to obtain access to the burner; but in some cases it may be made as part of the top C.

The term "gas" is intended to include any form of gaseous or vaporized material which may be employed for illuminating purposes or as a fuel.

We claim—

1. In a stove, a burner adapted to deliver the gas-mixture to be burned into an enlarged perforated heating and mixing chamber or chimney, combined with a flame spreading and distributing device extended into the flame below the top of the said chimney, the latter, through its perforations, supplying the gas-mixture with heated atmospheric air and minutely commingling the same with the flame, to make greater heat and effect more complete combustion, the spreading device distributing the flame over a large area, as and for the purpose described.

2. In a stove, the stove body and burner and perforated chimney above and around it, combined with the flame-spreading device supported upon the said stove-body, and extended down into the said chimney and into the flame issuing from the said burner, substantially as and for the purpose described.

3. In a stove, the stove body and burner and perforated chimney $f$ above the same, combined with the flame-spreading device supported by the said stove-body, and extended down into the said chimney and into the flame issuing from the burner, and the detachable top T, having two or more holes or openings for cooking-utensils, substantially as described.

4. The base and burner, combined with the top supported above the said base, consisting of a substantially flat or horizontal part having a hood extending down toward the burner, and provided with fingers, and the flame-spreading device supported on the said fingers, substantially as described.

5. The base, burner thereon, and top supported above the said base, consisting of a flat portion, $c^2$, and hood $c^4$, the said flat portion being provided with openings 3 around the said hood, combined with the flame-spreading device supported by the said top in definite position with relation to the burner, substantially as described.

6. The base, drum, and burner, and larger perforated chimney extended above it, combined with the top, consisting of a flat portion having an upwardly-extended annular projection, $c^3$, and a downwardly-projecting hood, and the flame-spreading device supported on the said top, and having its lower end extended down into the said chimney, substantially as and for the purpose described.

7. In a gas-stove, the base A and burner, combined with the burner-holder, consisting of a socket, $i$, for the lower end of the burner, and the supporting-ring for the upper part of the burner and its base-piece $k$, adapted to embrace the socket $i$ and to be fastened upon the base A of the stove, substantially as described.

In testimony whereof we have signed our names to this specification in the presence of two subscribing witnesses.

WILLIAM FRANKLIN SHAW.
ALFRED S. DINSMORE.

Witnesses:
Jos. P. LIVERMORE,
FRED A. POWELL.